United States Patent
Ma et al.

(10) Patent No.: US 9,548,735 B1
(45) Date of Patent: Jan. 17, 2017

(54) SYSTEM AND METHOD FOR ADAPTIVE POWER MANAGEMENT

(71) Applicant: Maxim Integrated Products, Inc., San Jose, CA (US)

(72) Inventors: Edward Tangkwai Ma, Plano, TX (US); Nancy Kow Lida, Irving, TX (US); Sung Ung Kwak, Frisco, TX (US); Khankap Mounarath, Frisco, TX (US); Robert Michael Muchsel, Addison, TX (US); Hung Thanh Nguyen, Plano, TX (US); Gary Zanders, Fairview, TX (US)

(73) Assignee: Maxim Intergrated Products, Inc., San Jose, CA (US)

( * ) Notice: Subject to any disclaimer, the term of this patent is extended or adjusted under 35 U.S.C. 154(b) by 108 days.

(21) Appl. No.: 13/720,702

(22) Filed: Dec. 19, 2012

(51) Int. Cl.
*G06F 1/32* (2006.01)
*H03K 19/00* (2006.01)
*G06F 17/50* (2006.01)
*G06F 1/20* (2006.01)
*G06F 15/78* (2006.01)
*G06F 9/38* (2006.01)

(52) U.S. Cl.
CPC .......... *H03K 19/0016* (2013.01); *G06F 1/206* (2013.01); *G06F 1/3237* (2013.01); *G06F 1/3287* (2013.01); *G06F 9/3871* (2013.01); *G06F 15/7825* (2013.01); *G06F 17/5072* (2013.01); *G06F 2207/3864* (2013.01)

(58) Field of Classification Search
CPC .......... H03K 19/0013; H03K 19/0016; H03K 19/00315; H03K 19/00361; H03K 19/00384; G06F 1/3237; G06F 1/3287; G06F 9/3871; G06F 2207/3864

USPC ............ 326/33, 45, 46, 81, 83, 89, 93
See application file for complete search history.

(56) References Cited

U.S. PATENT DOCUMENTS

| | | | | |
|---|---|---|---|---|
| 5,367,209 A * | 11/1994 | Hauck | ............ | H03K 19/17704 326/39 |
| 5,748,487 A * | 5/1998 | Sawasaki | ............ | G06F 17/5059 716/103 |
| 6,320,418 B1 * | 11/2001 | Fujii | ............ | G06F 1/32 326/112 |
| 6,590,424 B2 * | 7/2003 | Singh | ............ | G06F 7/00 326/21 |
| 6,946,869 B2 * | 9/2005 | Jacobson | ............ | H03K 19/0016 326/33 |
| 7,053,665 B2 * | 5/2006 | Singh | ............ | G06F 9/3871 326/112 |

(Continued)

OTHER PUBLICATIONS

Externally Hazard-Free Implementations of Asynchronous Control Circuits—By Sawasaki—IEEE Transactions on Computer-Aided Design of Integrated Circuits and Systems, vol. 16, No. 8, Aug. 1997.*

*Primary Examiner* — Jason M Crawford
*Assistant Examiner* — Kurtis R Bahr
(74) *Attorney, Agent, or Firm* — North Weber & Baugh LLP (57) ABSTRACT

Various embodiments of the invention allow to effectively reduce device and system power consumption in both active and inactive modes without compromising performance, without large area overhead, and at low cost. In certain embodiments, the reduction of power consumption is accomplished by combining circuit control techniques with power gating methods to reduce power loss due to leakage current.

19 Claims, 9 Drawing Sheets

(56) References Cited

U.S. PATENT DOCUMENTS

| | | | | |
|---|---|---|---|---|
| 7,977,972 B2* | 7/2011 | Di | ................ | H03K 19/0016 |
| | | | | 326/21 |
| 8,294,490 B1* | 10/2012 | Kaviani | ........... | H03K 19/01855 |
| | | | | 326/101 |
| 8,587,356 B2* | 11/2013 | Zhang | .............. | H03K 3/356008 |
| | | | | 327/218 |
| 8,706,793 B1* | 4/2014 | Young | ................ | G06F 5/01 |
| | | | | 708/620 |
| 2004/0130349 A1* | 7/2004 | Morgenshtein | .... | H03K 19/0948 |
| | | | | 326/112 |
| 2005/0007170 A1* | 1/2005 | Nakahara | ................ | G11C 7/22 |
| | | | | 327/199 |
| 2006/0248367 A1* | 11/2006 | Fischer | .................. | G06F 1/12 |
| | | | | 713/401 |
| 2009/0167380 A1* | 7/2009 | Sotiriou | .................. | G06F 1/10 |
| | | | | 327/153 |
| 2010/0229143 A1* | 9/2010 | Shi | .................. | G02F 17/5013 |
| | | | | 716/104 |
| 2013/0099570 A1* | 4/2013 | Manohar | ................ | H03K 17/20 |
| | | | | 307/38 |

* cited by examiner

SYSTEM AND METHOD FOR ADAPTIVE POWER MANAGEMENT

BACKGROUND

A. Technical Field

The present invention relates to data processing systems, and more particularly, to systems and methods of managing power and reducing power consumption in digital logic circuits.

B. Background of the Invention

Power dissipation in semiconductor devices mainly consists of static power losses primarily caused by current leakage across the semiconductor P-N junction and oxide layers of transistors during the non-conducting state of the device, and dynamic power consumption caused by devices switching on and off.

Figure 1:
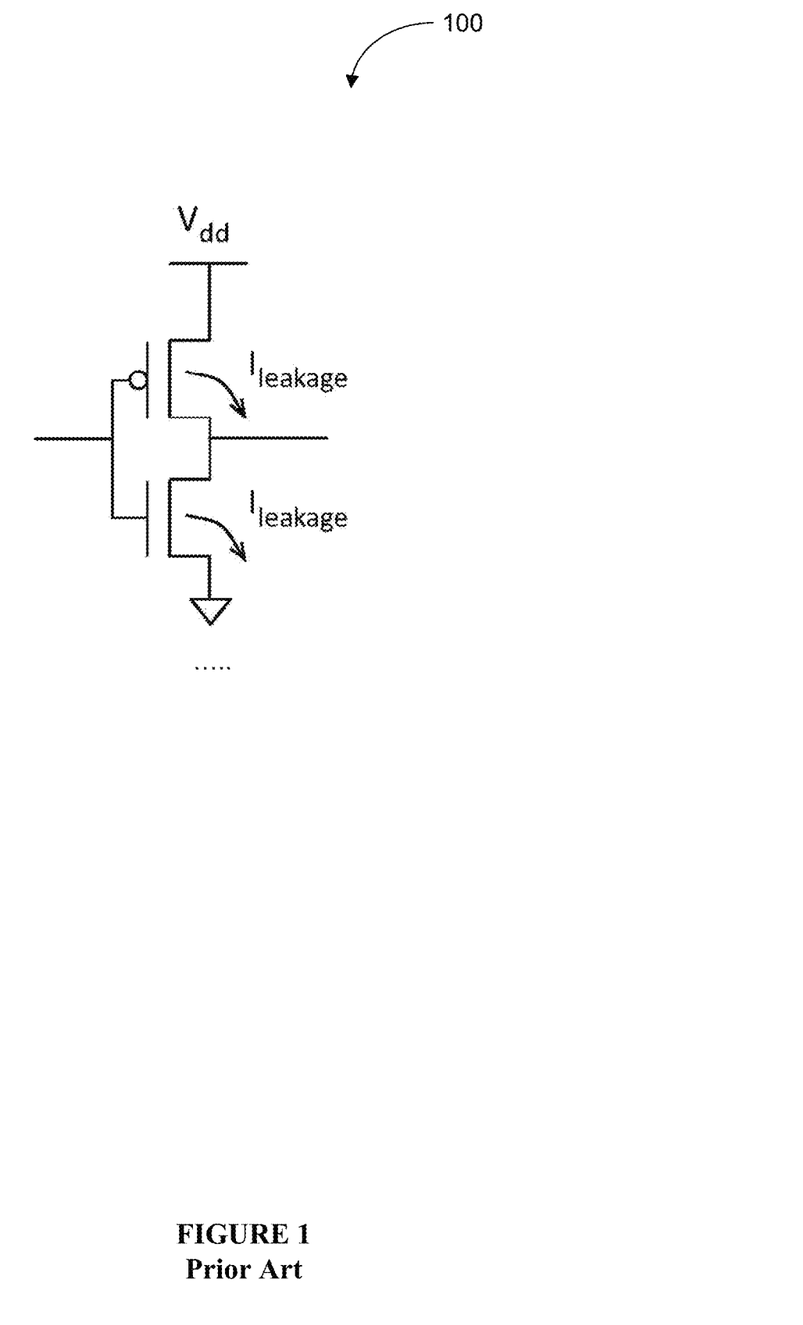

At small process technology nodes, leakage (FIG. 1) may become the dominant source of power loss, greatly exceeding dynamic power consumption. As process technologies scale to even smaller nodes, power loss due to wasteful leakage increases exponentially. Therefore, reducing power dissipation caused by leakage becomes an increasingly important goal in designing systems-on-chip.

What is needed are systems and methods to overcome the above-described limitations.

SUMMARY OF THE INVENTION

Various embodiments of the invention elegantly take advantage of existing control structures in data processing systems to reduce circuit components and to naturally reduce power consumption in both active and passive modes of operation. In particular, certain embodiments of the invention take advantage of existing system control signals and use basic hazard-free logic components to act in concert with power gating circuitry to reduce current consumption in a system, avoiding the addition of significant amounts of circuitry otherwise necessary for effective power management. The hazard-free logic components are used to synchronize groups of control signals and/or to detect completion of independent logical operations.

In one embodiment, a micro-pipeline system comprises Muller C-elements with power gates that provide system handshake between pipeline stages while performing power gating functions in a pipeline stage. The same handshake components also turn on and off combinatorial logic in each pipeline stage as operation progresses through the system.

In certain embodiments of the invention, an asynchronous system automatically keeps only parts of a circuit alive that are needed to actively perform operations, such as control operations, without having to substitute for a clock signal.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIGURE ("FIG.") 1 is a general illustration of leakage current that causes power loss at small process technologies in the prior art.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document the terms "block," "logic block," and "stage" are used interchangeably to denote a set of logic that performs a particular function within a in sequence and stores an answer in a storage element. The term "stage," includes two blocks in parallel and other configurations recognized by one of skilled in the art.

Figure 2:
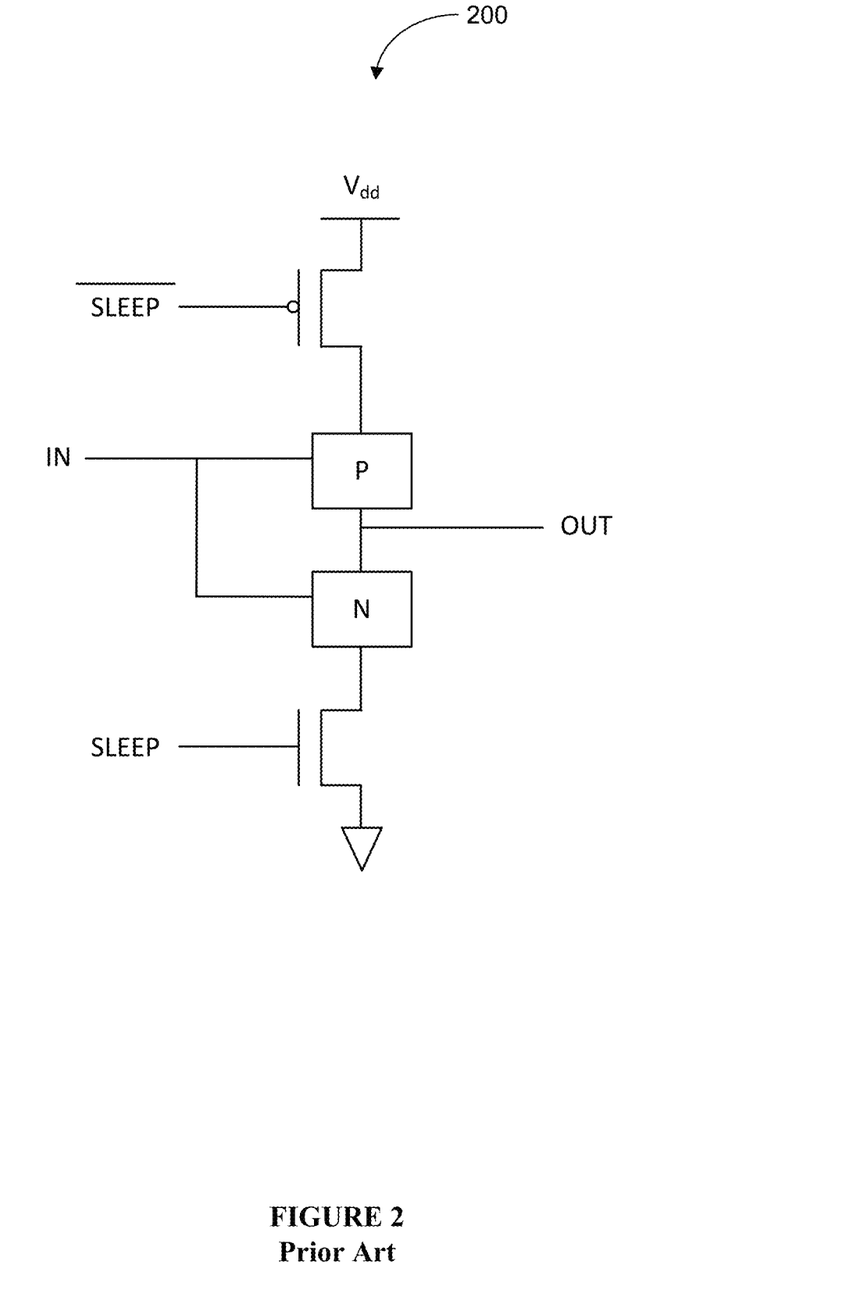
FIG. 2 illustrates a prior art power gating circuit for cutting off power to transistors at times when power is not needed.

FIG. 2 illustrates a prior art power gating circuit. In order to reduce leakage, synchronous digital circuits oftentimes employ specialized power gating circuitry to cut off power to logic blocks for intervals of time when power is not needed, for example, when the logic block is in idle condition or in standby mode, by asserting a signal (SLEEP).

Most digital circuits are synchronous designs that rely on a fixed-period central clock. Clock signals are externally generated and distributed to system components. Existing power gating techniques involve a central power gating controller and complex, topology-dependent monitoring of sections of a centralized circuit that are unused and require no power at any given period of time. However, since information about unused parts of the circuit is not readily available, the hardware overhead required to identify sources of potential power savings is significant. In addition, since the system must constantly go through complicated sequences to power up and down various parts of a circuit to save power, a significant operational overhead is required. After verifying that certain conditions are met, the central power gating controller applies a SLEEP signal to identified logic devices to cut off power in order to reduce power losses.

However, due to the synchronous nature of such designs, a subsequent transition to the active mode to restore power requires triggering the SLEEP signal on a clock edge to de-asserted the signal across multiple logic blocks simultaneously. Restoring power to logic blocks in this manner is problematic, as it causes potentially large inrush currents that can negate the power saving benefit gained from power gating.

In pipelined designs, even after a transistor device receives a SLEEP signal, the power to the entire logic block must be left turned on until all outstanding operations in the pipeline are executed. During this time, power must be supplied to idling logic blocks that do not participate in any operation, which unnecessarily contributes to the leakage problem. Further, in order to avoid unwanted logic glitches, switching times for the power gating transistors may have to be high, such that the resulting delays require an appropriate reduction in the clock frequency in order to account for the delays. As a result, the overall system may experience a large degradation in performance. Therefore, it would be desirable have a power gating system that can reduce power consumption without degrading overall system performance.

Figure 3:
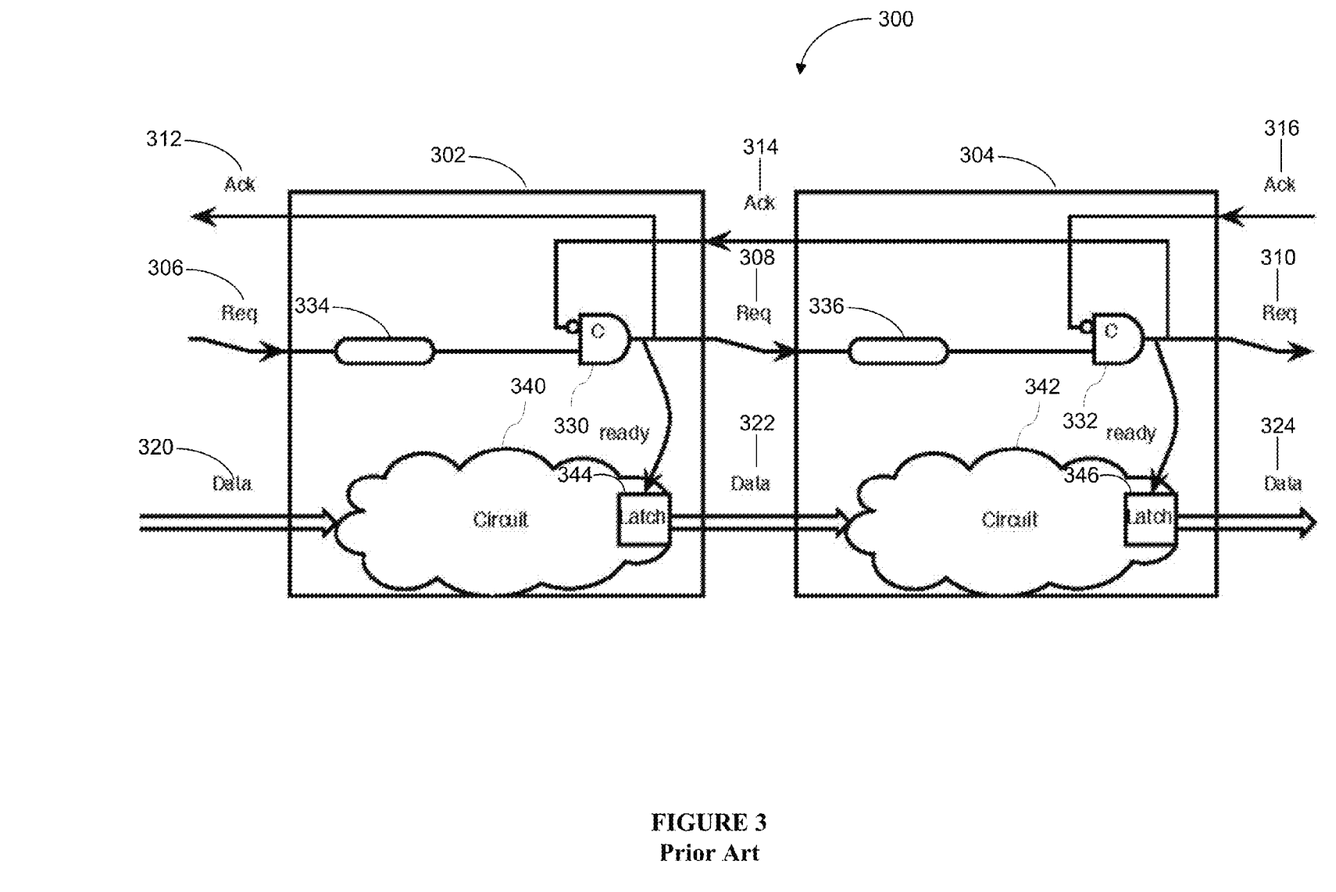
FIG. 3 illustrates a prior art circuit in a micro-pipeline configuration.

FIG. 3 illustrates a prior art circuit in a micro-pipeline configuration comprising a combination of two logic blocks. The architecture in FIG. 3 is an asynchronous circuit that utilizes a pipelined device configuration to process data in multiple processing stages, such that the processing result of one stage (e.g., logic block 302) is forwarded to the next processing stage (e.g., logic block 304) for further processing.

In the literature, clock-less or self-timed asynchronous circuits typically function in a predetermined sequence. As shown in FIG. 3, instead of being dependent on a central clock, asynchronous circuit 300 enables asynchronous data communication by generating handshake control signals that flow in localized control paths between components. The control signals initiate logic transitions to transfer data along a data path from one stage to the next. Control signals typically follow a protocol, such as a pipeline handshake protocol, that "synchronizes" communications according to an event-driven, localized timing scheme. Circuit 300 is implemented in a microprocessor, for example, as a number of independent modules that process logic combinations of locally generated events.

Asynchronous pipeline control signals in FIG. 3, include request signals ("Req") 306-310, which request the start of a data transfer, and corresponding acknowledge signals ("Ack") 312-316, which indicate the completion of that transfer. Asynchronous control signals 306-316 are implemented as digital signals that are delivered by logic transitions on separate receive and acknowledge lines. The handshake control signals in the control path are generated by Muller C-element 330, 332, a hazard-free logic building block in asynchronous design. Muller C-element 330, 332 is a state-holding element that synchronizes handshake control signals to ensure orderly execution of logic blocks 302, 304.

In detail, at a first input terminal, C-element 330, receives Req signal 306 via delay block 334. At a second input terminal, C-element 330, receives Ack signal 314 from logic block 304. At its output terminal, C-element 330, generates Req signal 308 and Ack signal 312. When both signals at the input terminals of Muller C-element 330, 332 are set to zero, the control signal at the output terminal is set to zero, and when both signals at the input terminals are set to one, the control signal at the output terminal is set to one. For other input signal combinations the output does not change. In other words, C-element 330, 332 is transparent when all input signals have the same logic level; otherwise, the output retains its current state.

The micro-pipeline configuration of asynchronous circuit 300 uses delays matched to logic blocks 302, 304. Req signal 306 is coupled to C-element 330 via control logic delay block 334. Delay block 334 comprises a delay element that delays the assertion of Req signal 306 to C-element 330 to ensure that data 320 stored in output latch circuit 344 will be valid when logic block 302 is ready to begin its execution cycle.

The data path in which data 320, 324 flows in circuit 300 comprises circuit 340, 342 and output latch circuit 344, 346. In operation, asserting Req signal 308, for example, indicates to logic block 304 that logic block 302 has completed its execution and that processed data 322 is available to logic block 304 for further processing. Upon injecting Req signal 308, logic block 304 processes data 322 that logic block 304 received at its input and passes it as processed data 324 to the input of the next logic block (not shown) in the pipeline. The length of the computation is determined by the expiration of control logic delay 336. When the computation is completed, Req signal 308 progresses to C-element 332. The second input to C-element 332 is the inverted Ack signal 316. Since the example in FIG. 3 uses a four-phase handshaking system (see FIG. 4), Ack signal 316 set low. Therefore, both inputs of C-element 332 are set high which causes C-element 332 to output a high level Ack signal 314 and Req signal 310. The high level Ack signal 314 is made available to logic block 302, so that logic block 302 can now accept new data at its input to overwrite data 320 that is no longer needed to continue the workflow. Ack signal 314 and Req signal 310 are coupled to output latch 346 of logic block 304. The processed data 324 is then latched to output latch 346. Finally, Ack signal 314 reaches logic block 302 and causes it to deassert Req signal 308.

Asynchronous circuits, such circuit 300 in FIG. 3, are inherently adaptive and operate without deadtime, as data exchange is event driven and occurs at negotiated times. In contrast, a synchronous counterpart circuit must wait for all processing stages to complete their operations. However, due to the leakage problem previously described, asynchronous designs are still not optimal in terms of power.

Figure 4:
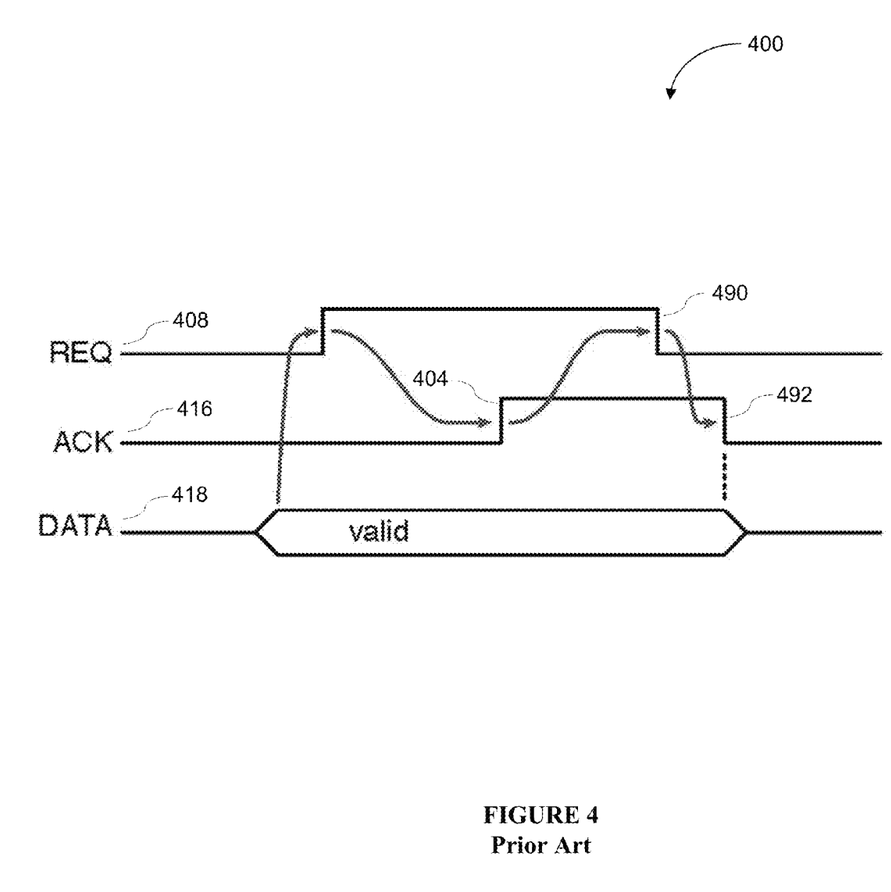
FIG. 4 illustrates a prior art timing diagram for a four-phase bundled data handshaking mechanism in a delay-sensitive asynchronous system.

FIG. 4 illustrates a prior art timing diagram for a four-phase bundled-data handshaking mechanism in a delay-sensitive asynchronous system. The term bundled refers to the combination of data signals with request and acknowledge wires to encode information using Boolean levels. Four-phase handshaking is also known as "return-to-zero signaling" or "level signaling."

According to a request-acknowledge based handshaking protocol, request signal Req 408 and acknowledge signal Ack 416 are asserted and de-asserted in the following sequence: Once data signal 418 is valid, the computation cycle is initiated by the asserting Req 408, such that an associated data processing circuit can process data. When Req 408 is high and Ack 416 is low, this indicates that an input request is made to the circuit, but no output complete confirmation is available. During the computation cycle, data is processed until, for example, a time for a control logic delay expires and Ack 416 is set to logic high.

Note that in the four-phase bundled-data example shown here, the active signal edge is a rising edge 404, and no computations or data transfer takes place during falling edges 490, 492 of Req signal 408 and Ack signal 416.

Figure 5:
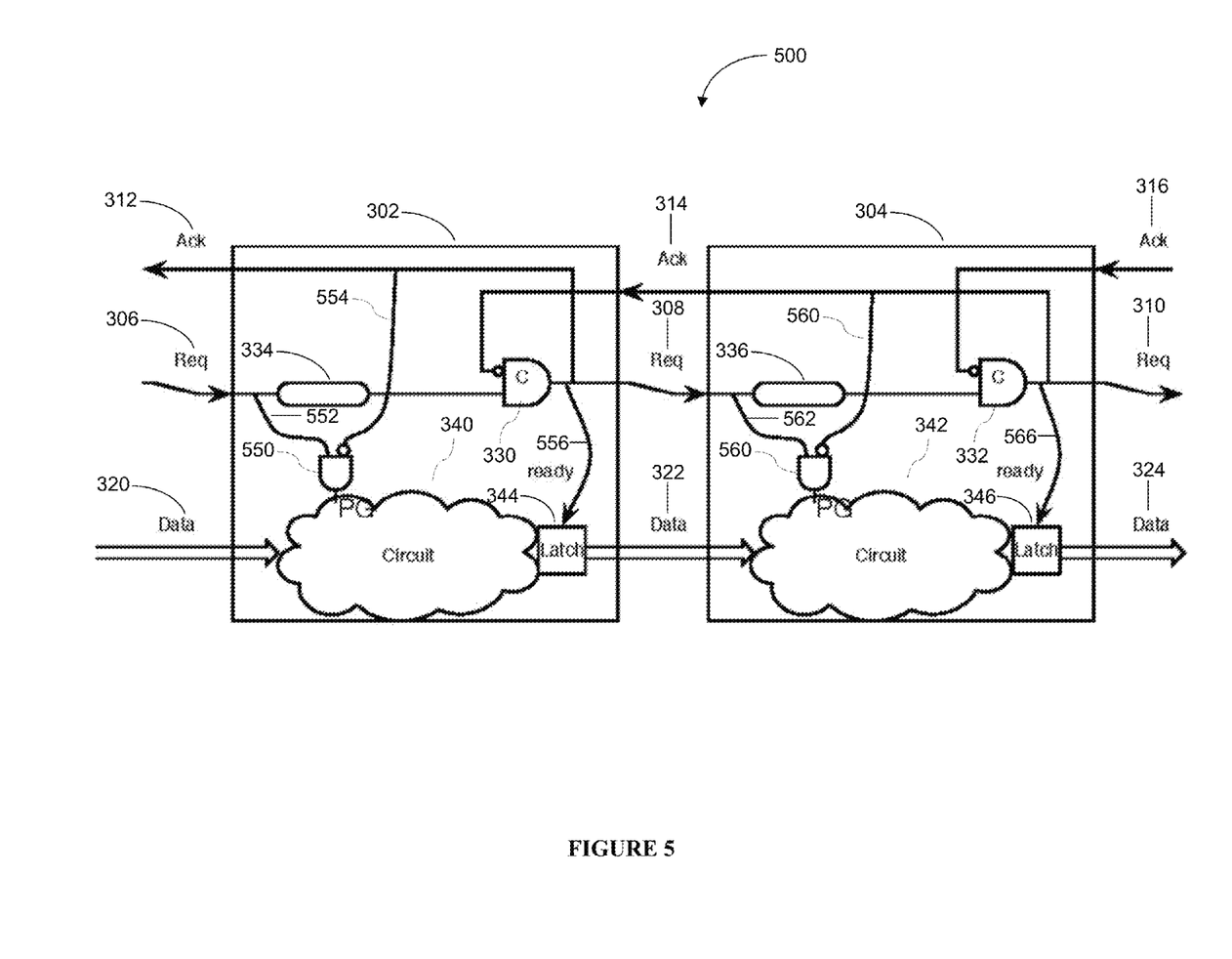
FIG. 5 illustrates an exemplary asynchronous system, according to various embodiments of the invention, as applied to a delay-sensitive micro-pipeline implementation.

FIG. 5 illustrates an exemplary system, as applied to an asynchronous delay-sensitive micro-pipeline implementation, according to various embodiments of the invention. Same numerals as in FIG. 3 denote similar elements. For illustration purposes, FIG. 5 shows an asynchronous pipeline architecture, but it is intended to conceptually represent any circuit, including synchronous circuits.

System 500, which may be implemented in a microprocessor, comprises two asynchronous sequential processing stages, or logic blocks, 302, 304 that are coupled to each other via control and data signals 306-324. Control signals 306-316 are coupled to a power source (not shown). The output signals of logic block 302 are designated as input signals of subsequent logic block 304 and vice versa. Any number of additional sequential processing stages or logic blocks may precede or follow logic block 302, 304. Where the description herein discusses only one logic block, it is understood that other logic blocks function similarly.

As shown in FIG. 5, logic block 302 receives handshake control signals 306 and 314 and generates control signals 308 and 312 via Muller C-element 330, for example, according to the operating principles previously described with respect to FIG. 3. In one embodiment, C-element 330 is coupled to receive Req signal 306 from a preceding logic block (not shown) and Ack signal 314 from logic block 304. C-element 330 outputs control signal Req 308 to logic block 304 and Ack 312 to the preceding logic block. As such, C-element 330 synchronizes logic block 302 with the preceding logic block and with logic block 304 in system 500. In one embodiment, C-element 330 comprises storage, e.g., latches, for one or more handshaking control signals.

Output latch 344 may be a common digital latch that stores data 322 at the end of a computation cycle of logic block 302. Output latch 344 may be implemented as part of circuit 340. In one embodiment, output latch 344 remains powered at all times, together with the control circuitry, while logic circuitry between incoming data 320 and output latch 344 is turned off to save power, e.g., at idle and standby times.

In a manner similar to FIG. 3, circuit 340 receives and processes incoming data 320. However, unlike the architecture shown in FIG. 3, system 500 comprises power gating circuit 550, 560 coupled to a power source, for example, a single power supply (not shown) coupled between $V_{DD}$ and a reference potential. For purposes of illustration, power gating circuit 550 is configured to deliver power to circuit 340. Processed data 322 is output via output latch circuit 344.

Power gating circuit 550, 560, circuit 340, 342, and output latch circuit 344, 346 are examples of circuitry that may be controlled by control signals 306-316. Power gating circuit 550 is coupled to control signals Req 306 and Ack 312 to turn power to circuit 340 on and off. When control signal Ack 312 is asserted, it also signals to the preceding stage that power is turned off in circuit 340, and that processed data 322 is ready to be transferred to the logic block 304.

Power gating block 550 may be implemented with power PMOS gating transistors to turn on and off, for example, through a power switch coupled in series with circuit 340, 342. The implementation of power gating circuit 550 depends on the handshaking mechanism, which may operate, for example, according to a two-phase or four-phase handshaking communication protocol.

System 500 further comprises control logic delay circuit 334, 336 coupled between Req signal 306, 308 and C-element 330, 332, respectively. Delay circuit 334, 336 generates a control logic delay that is matched to for each logic block 302, 304. For illustration purposes, C-element 330 is coupled to receive Req signal 306 from the preceding logic block and Ack signal 314 from logic block 304. A delay element within delay circuit 334 delays the assertion of control signal Req 306 to C-element 330 to ensure that computed data 322 stored in output latch 344 is valid at the time logic block 302 has completed a computation cycle.

In one embodiment, delay circuit 334, 336 may comprise circuitry to accommodate additional delays, such as a delay for power gate 550, 560. For example, power gating circuit 550 may be enabled after a relatively short delay that is added to extend the control logic delay in order to account for circuit delays caused by power gating circuit 550.

In one embodiment, power is managed by successively controlling power gating blocks 550, 560 in logic blocks 302, 304 via handshaking signals. Logic blocks 302, 304 communicate via asynchronous data control signals Req 306-310 and Ack 312-316, in accordance with a four-phase handshaking communication protocol. Assuming that data 320 is valid, when Req signal 306 is asserted, this signals to logic block 302 that the preceding logic block has completed its computations, such that logic block 302 can now process data 320 received from the preceding logic block. Req signal 306 enables logic block 302 to provide power to circuit 340, for example, via one or more power transistors of power gating circuit 550.

Once circuit 340 is energized, it is ready to process data, until Ack signal 312 is asserted when the time for control logic delay expires. Asserting Ack signal 312 allows the preceding logic block to accept new data at its input to perform operations with. Additionally, asserting Ack signal 312 causes power gating circuitry 550 to disable circuit 340 by shutting off power to the power gates of power gating circuitry 550 after circuit 340 has processed data 320 allowing sufficient time for the resulting output data 322 to be stored in output latch circuit 344.

After circuit 340 completes the processing of data 320, it stores processed data 322 in output latch circuit 344, which makes processed data 322 available for transfer to logic block 304 for further processing. For example, when C-element 330 receives a logic high Req signal 306 and a logic high Ack signal 314, it generates a logic high output that activates output latch 344, which enables transfer of data 322 between logic block 302 and the immediately following logic block 304.

Due to the asynchronous, pseudo-random nature of system 500, there is no point in time where a majority of power gates are enabled. Thus, one advantage of this embodiment is that there is no significant current inrush issue. Although the computation for each individual pipeline stage in itself is predicable, in a system with a sufficiently high number of pipelined stages with numerous localized turning on and off events creates a randomized, white noise like pattern. This phenomenon may provide benefits for cryptographic purposes since the white noise pattern masks the sequence of computations and makes it extremely difficult to extract information from spike patterns of signals radiating from the system.

Further, since asynchronous circuit time intervals adapt to environmental changes, such as temperature and supply voltage variations, the performance impact of applying power gating to an asynchronous circuit is negligible when compared to existing power gating techniques. In the case of clocked logic, the maximum speed of the system is determined by the worst-case timing through the critical (longest) path, which limits the achievable system performance.

Another advantage is that all of the logic blocks performing actual calculations have to be operated, which results in a lower power consumption when compared to clocked logic structures where clock operations are continuously active even in parts of the structure that are unnecessary for logic operation.

One skilled in the art will appreciate that any other communication protocol and transitioning signal circuit may be used to provide functions to enable power gating of data processing circuit. For example, a logic block or a centralized microcontroller may provide a signal to turn off the data processing circuit, e.g., in response to receiving a feedback signal. Note that power gating may also be overridden by a centralized override signal, for example, to select individual stages to process data. Other variations include control signals that carry power to directly power a data processing circuit and additional power carrying wires that may be used. Furthermore, the systems and methods presented can equally be extended to synchronous designs.

Figure 9:
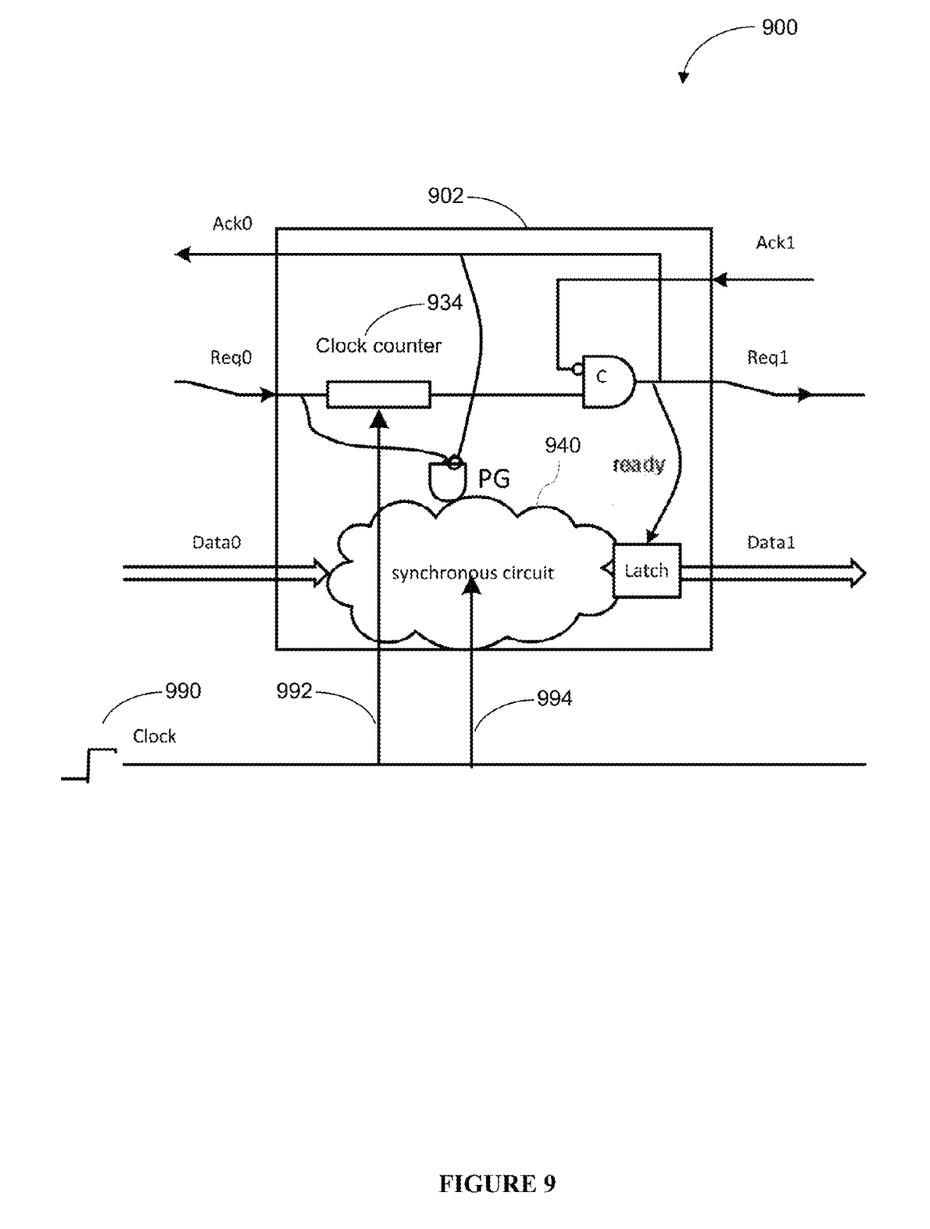
FIG. 9 illustrates an exemplary synchronous system, according to various embodiments of the invention.

FIG. 9 illustrates an exemplary synchronous system, according to various embodiments of the invention. For simplicity and brevity, elements that are common with architecture in FIG. 5 are not enumerated and a repetition of their functionality is omitted. Circuit 940 is a synchronous circuit that may be clocked by an internal or external clock 990 via clock signal 994. Clock signal 994 may comprise a periodic train of pulses that are in phase with clock 990. Clock counter 934 may be coupled between a control signal, here Req0, and a C-element. Clock counter 934 may be a digital counter or any other mechanism that is configured to determine whether a computation cycle is completed. In one embodiment, clock counter 934 may be clocked by clock 990 via clock signal 992 that is separate from clock signal 994.

Unlike traditional power gating systems, this embodiment provides for a local and decentralized power gating approach. System 900 may be easier to implement and potentially more effective than existing global power gating control systems. For example, every stage or logic block may be individually optimized to increase overall system performance. One skilled in the art will recognize that the use of control signals is not limited to the examples provided herein, and the conventional operations of function execution are not limited to the physical implementations in the drawings. Any number of logic blocks and stages may be added or omitted, and definitions of signal polarities and directions may be reversed without loss of generality.

Figure 6:
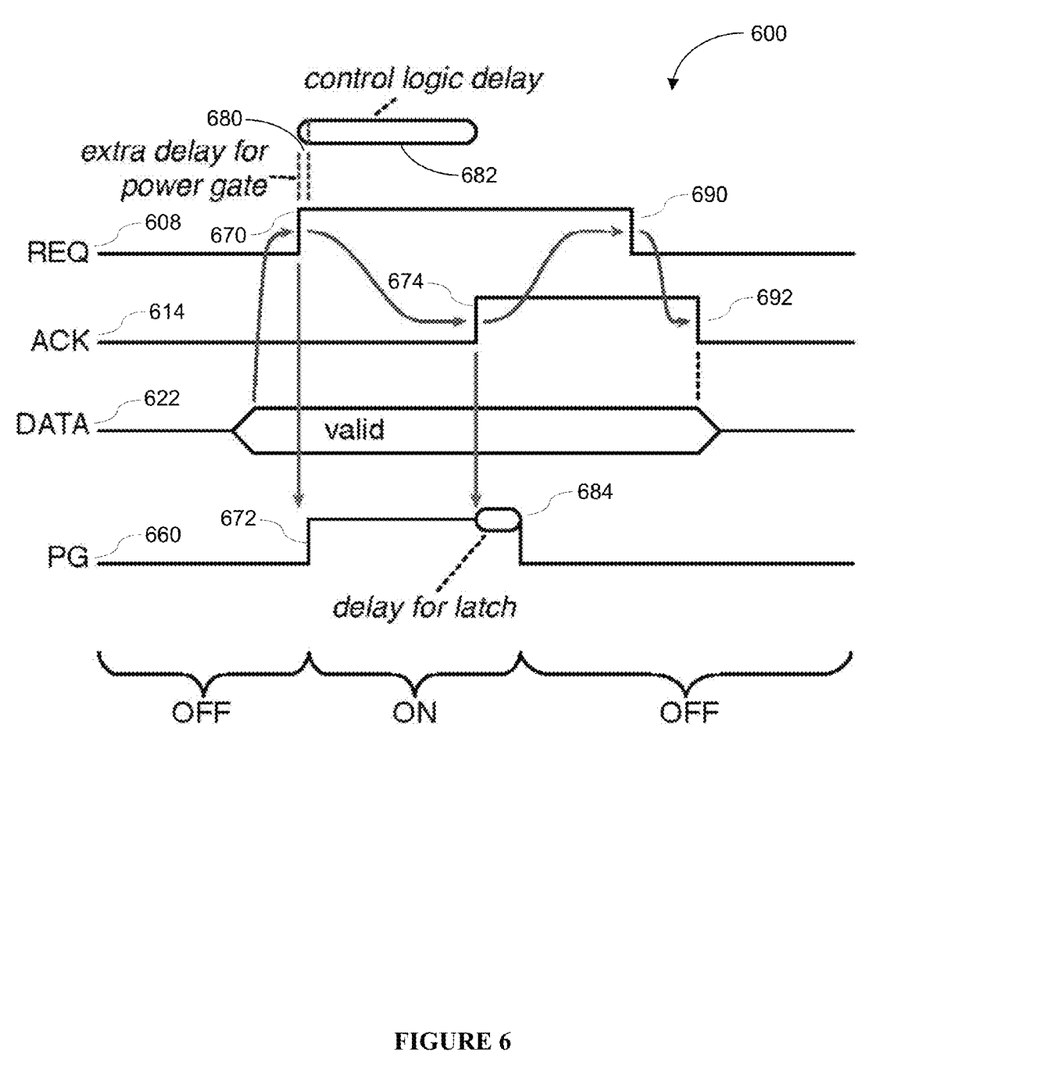
FIG. 6 illustrates an exemplary timing diagram that implements power gating according to various embodiments of the invention.

FIG. 6 illustrates an exemplary timing diagram that implements power gating according to various embodiments of the invention. In this embodiment, power gating is applied to a delay-sensitive system that utilizes a four-phase handshaking mechanism to control multiple stages configured in a pipelined system. Req signal 608, Ack signal 614, and data signal 622 may be asserted and de-asserted in the same sequence as corresponding signals previously described in FIG. 4. If the prerequisite that data 622 at the output of a preceding stage is valid is satisfied (i.e., the preceding stage has completed its computations) data 622 is available to be transferred to the current stage, then a computation cycle may be initiated by the preceding stage by asserting Req signal 608, for example, on rising edge 670. In cases where the current stage is an initial stage, Req signal 608 may be continuously triggered to ensure that the computation cycle will be initiated.

The computation cycle of the current stage may begin when power gating signal 660 transitions to a logic high, which turns on a power gating circuit (e.g., a simple power logic gate), so that a data processing circuit may perform logic functions on data that is made available to the current stage, for example, from the preceding stage. Power gating signal 660 may automatically turn on the power gating circuit, for example, when Req signal 608 is set high and Ack signal 614 is set low, which indicates that an input request is made to the current stage, but an output complete confirmation is not yet available.

In one embodiment, a relatively short time delay 680 is added to control logic delay 682 to account for circuit delays within the current stage that are caused by operating the power gating circuit. During the computation cycle, data is processed until the time for control logic delay 682 expires. In one delay-sensitive embodiment, the expiration time of control logic delay 682 varies from one stage to the next stage, such that different control logic delays 682 should be computed for each stage.

The expiration of the time for control logic delay 682 signals that the computation cycle in the current stage has ended. At this time, the current stage sets Ack signal 614 to logic high (or if the current stage is the final stage Ack signal 614 may be continuously triggered at a logic high level), to indicate to the preceding stage that the computation cycle in the current stage has completed, so that that the previous stage can disregard its current data and calculate new incoming data. But before power gating signal 660 transitions to logic low to cut off power to the logic block in the current stage, it remains at logic high for a relatively short latch delay time 684 designed to allow the output latch circuit to fully complete its operations prior to transferring the data to the following stage.

Finally, once Ack signal 614 reaches the preceding logic block it causes the preceding logic block to deassert Req signal 608 on a falling edge 690. Note that, in this embodiment, no computations or data transfer takes place during falling edges 690, 692 of Req signal 608 and Ack signal 614.

In one embodiment, latch delay 684 is generated by the same circuit that generates control logic delay 682. Ignoring latch delay 684, the truth table for power gating signal 660 can be represented by a simple AND gate, as illustrated by FIGS. 7A and 7B.

Figure 7A:
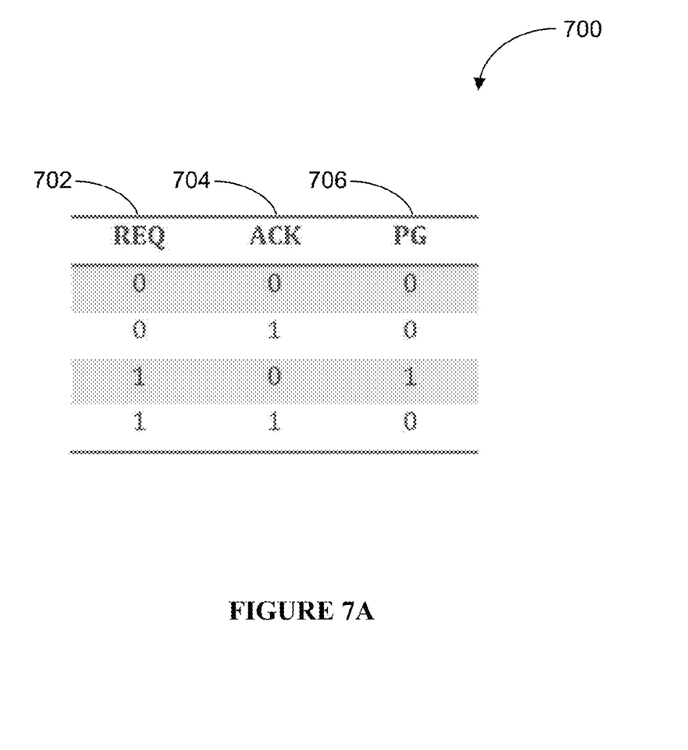
FIG. 7A is an exemplary truth table for a power gating signal in an asynchronous system according to various embodiments of the invention.

FIG. 7A is an exemplary truth table for a power gating signal in an asynchronous system, according to various embodiments of the invention. Power gating signal 706 is enabled, i.e., set to logic 1 (or true) only when Req signal 702 is set to logic 1 and Ack signal 704 is set to logic 0 (or false). Note that Ack signal 704 is inverted to a logic 1 by the inverting input. For all other combinations of Req signal 704 and Ack signal 704 power gating signal 706 remains disabled, i.e. at logic 0. Similar truth tables 700 may be created for other embodiments.

Figure 7B:
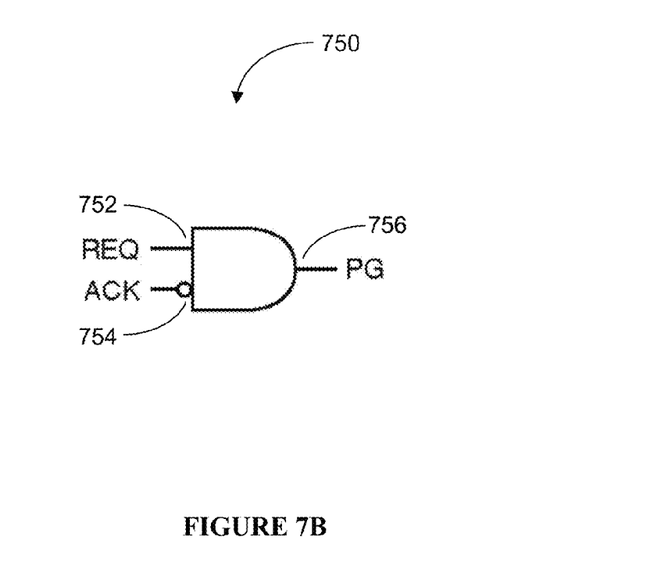
FIG. 7B is a conceptual logical symbol diagram of the power gating logic for reducing leakage in an asynchronous system, according to various embodiments of the invention.

FIG. 7B is a conceptual logical symbol diagram of the power gating logic for reducing leakage in an asynchronous system, according to various embodiments of the invention. Power gating logic 750 can be regarded as an AND gate circuit that comprises two input terminals 752, 754 and one output terminal 756. First input terminal 752 receives a request signal (Req), and second input terminal 754 receives an inverted acknowledge signal (Ack) signal. At output terminal 756, power gating logic 750 generates the resulting power gating signal. According to the truth table in FIG. 7A, the power gating signal is active only when a high Req signal is applied to first input terminal 752 and a low Ack signal is applied to second input terminal 754. For all other input combinations output terminal 756 generates a low power gating signal. Any other method using control signals Req and Ack are envisioned to generate the power gating signal, including the use of a time signal.

Figure 8:
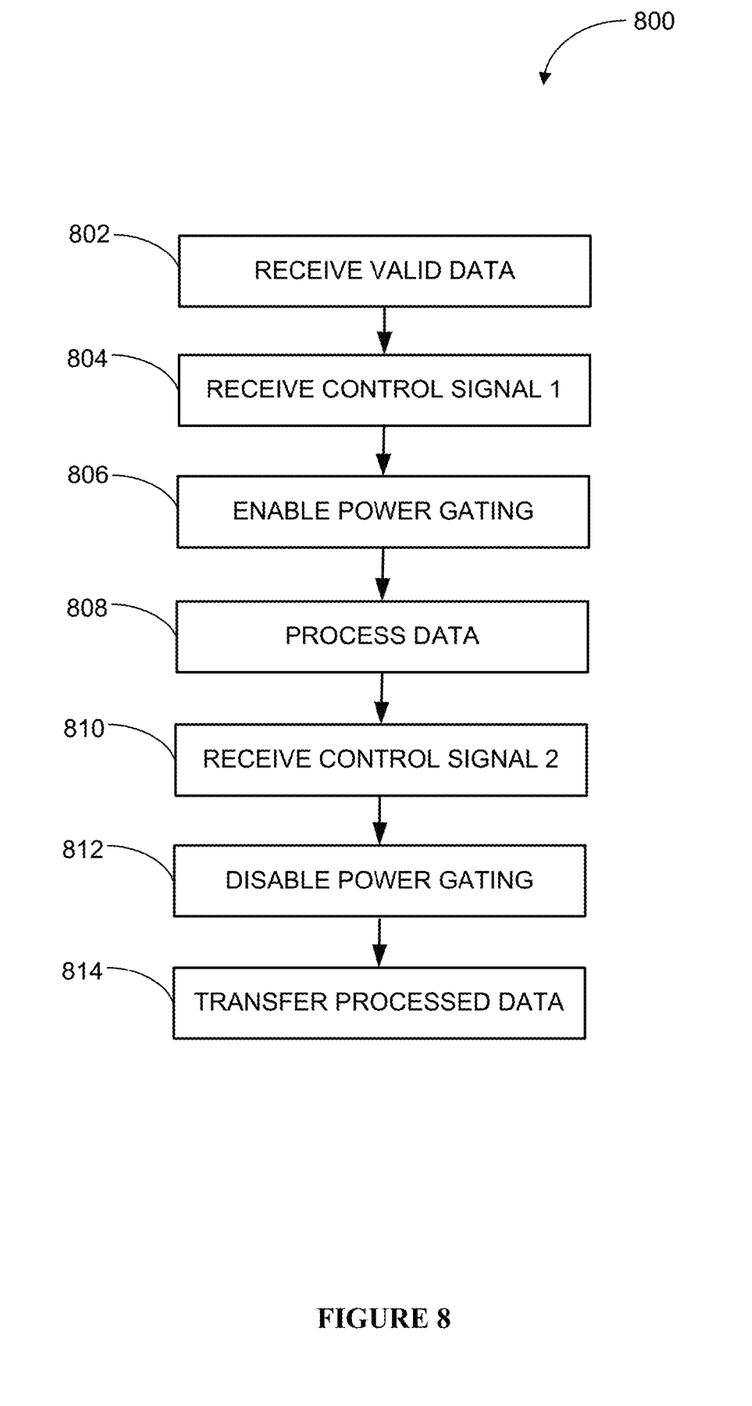
FIG. 8 is a flowchart of an illustrative process for reducing leakage in an asynchronous system in accordance with various embodiments of the invention.

FIG. 8 is a flowchart of an illustrative process for reducing leakage in an asynchronous system in accordance with various embodiments of the invention. The process for saving power in a system starts at step 802 by receiving valid data, for example, when the current stage in a pipeline configuration receives valid data from a preceding stage. The pipeline comprises multiple stages that may be synchronously or asynchronously operated.

At step 804, a first control signal is received, for example, from the preceding stage in form of a request signal. If the data in step 802 is valid, the first control signal may be automatically received by a power gating circuit coupled within the current stage.

At step 806, in response to the first control signal power gating is enabled, for example in the current stage.

Once power gating is enabled, at step 808, data is processed.

At step 810, a second control signal is received, for example, from a subsequent stage in the pipeline in form of an acknowledge signal or a delay expiration from the first control signal.

At step 812, in response to the second control signal power gating is disabled.

Finally, at step 814, the processed data is transferred, for example, to a following stage.

Note that any steps may occur simultaneously, automatically, or with delays.

It will be appreciated by those skilled in the art that fewer or additional steps may be incorporated with the steps illustrated herein without departing from the scope of the invention. No particular order is implied by the arrangement of blocks within the flowchart or the description herein.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A method for managing power in an electronic system, the method comprising:
    applying first and second control signals to a hazard-free logic component to synchronize a plurality of functional blocks that comprise data independent synchronous data processing circuits, the hazard-free logic component being use to at least partially control a transition from a purely asynchronous mode of operation to a partially synchronous mode of operation;
    applying the first control signal and a handshake signal to a power gating circuit that supplies power to at least one of the independent synchronous data processing circuits;
    performing a data processing step on data in response to energizing the at least one synchronous data processing circuit;
    outputting the handshake signal to acknowledge completion of logical operations;
    applying the first and handshake signals to the power gating circuit to de-energize the at least one synchronous data processing circuit; and
    outputting the processed data.

2. The method according to claim 1, wherein outputting the processed data comprises transferring the processed data to an output storage element.

3. The method according to claim 2, wherein the applying the handshake signal to the power gating circuit comprises triggering a first time delay to allow for the transferring the processed data to the output storage element.

4. The method according to claim 3, wherein power to the first data processing circuit is disabled after the first time delay expires.

5. The method according to claim 1, wherein the first and second control signals are automatically applied to the power gating circuit.

6. The method according to claim 1, further comprising applying the first control signal after a second time delay expires.

7. The method according to claim 1, further comprising outputting a fourth control signal to request a logical operation from a subsequent stage.

8. The method according to claim 1, further comprising sequentially supplying power to a second data processing circuit.

9. The method according to claim 8, further comprising asynchronously communicating between the first and second data processing circuits.

10. The method according to claim 1, further comprising overriding the first or second control signal via an override signal.

11. The system according to claim 1, wherein the handshake signal is an asynchronous handshake signal.

12. A data processing system comprising:
    a first stage comprising a synchronous circuit, the synchronous circuit is configured to perform a data processing step on data and output processed data;
    a first hazard-free logic component coupled within the first stage, the hazard-free logic component receives first and second handshake signals and at least partially controls a transition from a purely asynchronous mode of operation to a partially synchronous mode of operation;
    second and third stages coupled to the first stage, a second hazard-free logic component in the second stage generates the first handshake signal, and a third hazard-free logic component in the third stage generates the second control signal;

a power gating element coupled to the circuit, the power gating element supplies power to the circuit in response to the first and second handshake signals; and an output storage element coupled to the circuit, the output storage element comprises circuitry to store and output the processed data.

13. The system according to claim 12, wherein the handshake signal is an asynchronous handshake signal.

14. The system according to claim 12, wherein the power gating element disables power to the circuit after the circuit has performed the data processing step.

15. The system according to claim 12, wherein the first control signal is a request signal and the second control signal is an acknowledge signal.

16. The system according to claim 12, wherein two or more stages operate in parallel.

17. The system according to claim 12, further comprising a delay element coupled between the second stage and the first hazard-free logic component, the delay element is configured to delay the first handshake signal.

18. The system according to claim 12, wherein the first hazard-free logic component comprises:

a first input terminal to receive the first control signal;

a second input terminal to receive the second control signal; and an output terminal to output a third handshake signal, the third handshake signal has a same logical level as the first handshake signal when the first and second handshake signals are in different logical levels, and a previous state is maintained when the first and second handshake signals have the same logical level.

19. The system according to claim 12, wherein at least one of first, second, and third handshake signals is an asynchronous handshake signal.

* * * * *

UNITED STATES PATENT AND TRADEMARK OFFICE
CERTIFICATE OF CORRECTION

PATENT NO. : 9,548,735 B1  
APPLICATION NO. : 13/720702  
DATED : January 17, 2017  
INVENTOR(S) : Edward Tangkwai Ma et al.

Page 1 of 1

It is certified that error appears in the above-identified patent and that said Letters Patent is hereby corrected as shown below:

On the Title Page

Item (72) Inventors should read: Edward Tangkwai Ma, Plano, TX (US); Nancy Kow Iida, Irving, TX (US); Sung Ung Kwak, Frisco, TX (US); Khankap Mounarath, Frisco TX (US); Robert Michael Muchsel, Addison, TX (US); Hung Thanh Nguyen, Plano, TX (US); Gary Zanders, Fairview, TX (US)

Signed and Sealed this  
Fourth Day of April, 2017

Michelle K. Lee  
*Director of the United States Patent and Trademark Office*